May 3, 1949. C. J. LINDENTHALER 2,469,235
TRACTION DEVICE
Filed Jan. 2, 1947
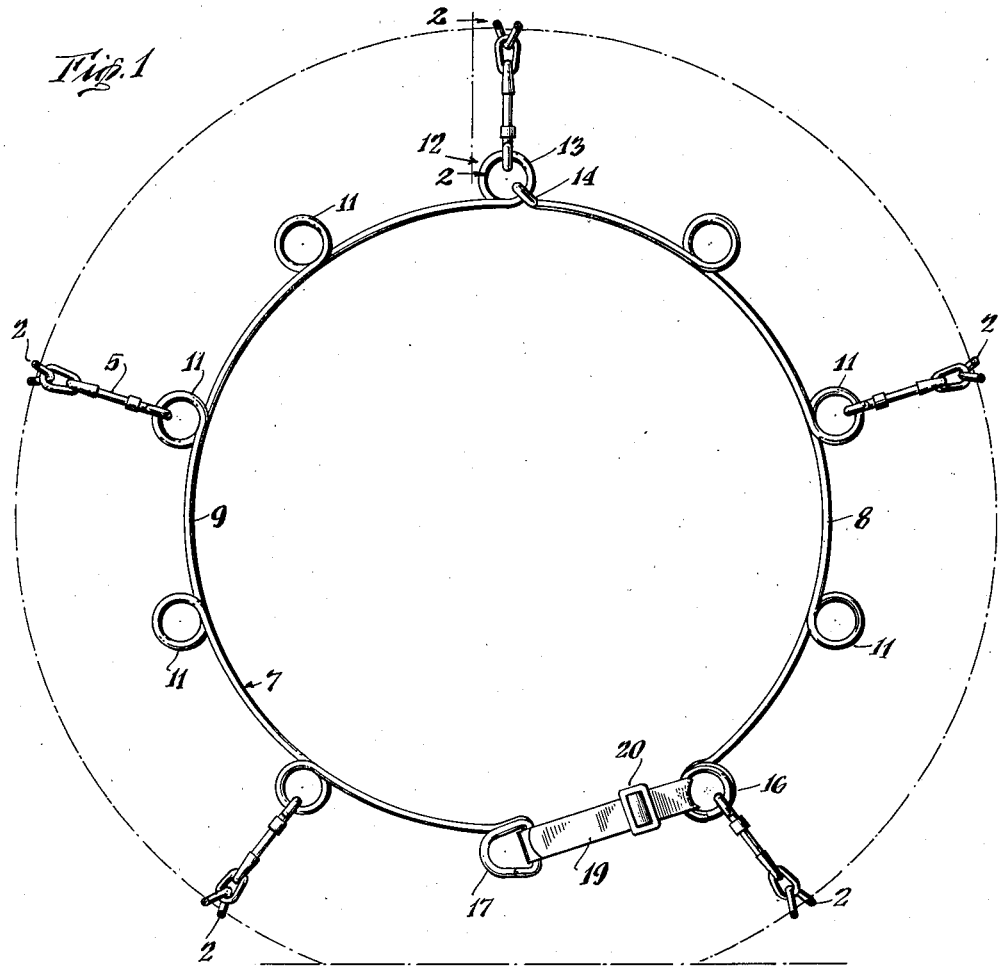
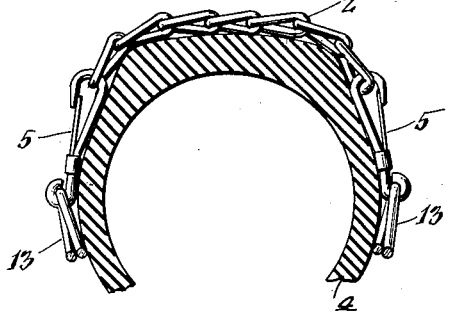
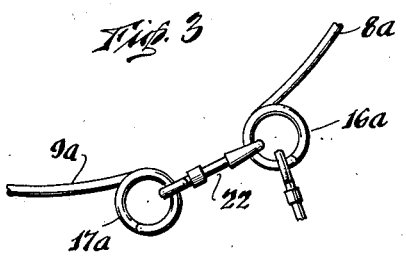
INVENTOR.
Charles John Lindenthaler
BY
Norman N. Holland
ATTORNEY Patented May 3, 1949

2,469,235

UNITED STATES PATENT OFFICE 2,469,235

TRACTION DEVICE

Charles John Lindenthaler, Chappaqua, N. Y., assignor to Minute Skid Chain Corporation, Long Island City, N. Y., a corporation of New York Application January 2, 1947, Serial No. 719,679

5 Claims. (Cl. 152—242)

The present invention relates to a means for improving the tractive effect of vehicle or automobile wheels.

Numerous devices have been conceived for use with automobile wheels to improve traction and to facilitate the automobile or other vehicle extricating itself from snow, mud or the like. Many of these previous devices have never gone into actual usage for the reasons that they were too complicated, too expensive, too difficult to apply and remove from a wheel, etc. Others which have been used present difficulties of application to and removal from a wheel, many are of relatively complicated construction, and others are relatively expensive.

It should be kept in mind that in many instances the driver of an automobile tends to procrastinate in applying a traction device, or "skid chains" as they are frequently called, until he is actually in difficulty with the vehicle bogged down in snow or mud. In such cases it is a quite difficult, dirty and laborious task to apply the usual traction devices to vehicle wheels.

The present invention aims to provide a new and improved traction device which may be readily attached to vehicle wheels regardless of whether the vehicle is standing on firm ground or is stuck in snow, mud or the like. The invention further contemplates the provision of a new and improved traction device which may be readily and inexpensively manufactured and sold and which is of such relatively simple and clear construction that it may be quickly placed in operative position on a vehicle wheel by an inexperienced person.

An object of the present invention is to provide a new and improved traction device.

Another object of the invention is to provide a new and improved traction device which may be readily attached to and removed from a vehicle wheel.

Another object of the invention is to provide a relatively simple traction device which may be inexpensively manufactured and sold.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side view of the present device in position on a vehicle wheel;

Fig. 2 is a fragmentary sectional view taken along the line 2—2 of Fig. 1; and

Fig. 3 is an enlarged fragmentary view showing one form of securing means.

Referring more particularly to Fig. 1 of the drawings, the present traction device is shown in place about a tire of a vehicle. It is believed that showing and describing the device as it is actually used on a vehicle wheel will best bring out its desirable and advantageous features.

The actual tractive effect is provided by a plurality of transversely extending portions 2 which extend over or cross the outer periphery of a tire or wheel 4 and are retained in position adjacent the ends thereof by suitable catch means 5. The present invention is more particularly concerned with the retaining or securing means 7 which co-operates with and serves to hold the transversely extending traction portions 2 and catch means 5 in desired positions.

As shown, the retaining means 7 comprises a pair of substantially semi-circular members 8 and 9, each of which is preferably provided with loops or convolutions 11 at spaced intervals and intermediate the ends of the substantially semi-circular members 8 and 9. While any suitable metal may be utilized for forming the semi-circular members 8 and 9, it is preferable to utilize a round stock material which may be readily formed into the desired shape and convolutions and yet which possesses a certain amount of elasticity or springiness.

One of the semi-circular members is preferably provided with a convolution or loop 13 adjacent to or at the end thereof adapted to co-operate with a suitable loop or ring 14 carried by the other or complementary semi-circular member to retain the two members together in operative relationship. The loop 13 may be formed of a single convolution of the round stock comprising the semi-circular member or, for purposes of strength, may be formed of such as one and one-half or two convolutions.

The connection between the ring or loop 14 of a member 8 and the loop or ring 13 of a semi-circular member 9 is preferably such as to provide a relatively loose joint so that, as will be hereinafter described in greater detail, the semi-circular members may be readily pivoted, rotated or moved about the connection formed by the portions 13 and 14 to provide for separation, in a hinge-like manner, of the opposite ends of the semi-circular members 8 and 9.

While the present invention will be described with reference to the utilization of loops or convolutions formed from the material of the semi-circular members 8 and 9, it is to be understood that suitable loop-like or apertured members may be welded, clipped or otherwise secured to the semi-circular members without being actually formed from the material of the semi-circular member itself.

The traction providing portions 2, hereinabove referred to, are preferably attached to the loops or apertured portions 11 or 13 by suitable snaps, catches, or other securing means 5, the latter means 5 being of such form as to provide for ready attachment of the transverse portions 2 with the loops 11 or removal of the transverse portions. This feature is desirable in connection with the substitution of generally known rubber pads or cross pieces for the chain type cross pieces 2 shown in the drawing; in some cases the maximum tractive effect provided by cross chains is not necessary and the rubber cross pieces or pads may be utilized, as they also posses the additional feature of minimizing objectionable bumping or vibration on partially cleared streets. While only alternate loops 11 are shown connected with cross pieces 2 in Fig. 1, it will be clear that all of the loops may be so connected or that any suitable arrangement may be adopted.

The normally free ends of the semi-circular members 8 and 9 opposite to the loose joint 12 are preferably provided with loops or apertured portions 16 and 17 and where loops are utilized they are preferably formed of more than a single convolution. For purposes of illustration the loop 16 is shown as formed of two convolutions and the loop 17 as formed of approximately one and one-half convolutions; the extra convolutions provide extra strength.

The end convolutions 16 and 17 are preferably interconnected by some suitable means such as a strap 19 shown extending through each of the loops and provided with a generally known form of automatic buckle lock 20. When the strap 19 is tightened to pull the loops 16 and 17 toward each other the semi-circular members 8 and 9 are pulled inwardly toward each other so that the effective diameter thereof is decreased. Since the opposite sides of the cross members 2 are similarly connected with corresponding semi-circular members located at the inner side of the tire 4, the cross pieces will be pulled inwardly firmly against the outer periphery of the tire or wheel 4. When the semi-circular members 8 and 9 at the outer side of a wheel and those at the inner side of the same wheel have been pulled together so that the cross pieces extend over and rest against the periphery of the tire, the strap 19 may be pulled into locked or strapped-together position, and the buckle 20 will serve to hold the strap and semi-circular members in this relationship. The corresponding semi-circular members which are located at the inner side of the same wheel are preferably held together by some convenient form of snap 22 such as that shown in Fig. 3 of the drawings, the snap catch 22 being connected through loops 16a and 17a of the corresponding inner members 8a and 9a; the utilization of a snap catch in lieu of a strap at the inside of the wheel facilitates application and securing together of the device on a vehicle wheel.

In applying the present device to a vehicle wheel, the semi-circular members 8 and 8a and the semi-circular members 9 and 9a may be spread apart with the loose joints 12 serving as a pivot point and the device lifted into position over the tire or wheel. The respective semi-circular members provide sufficient rigidity to facilitate lifting the device readily into position over the wheel, and when in position over the wheel the normally free ends of the semi-circular members may be pulled toward each other, the ends of the members at the inside of the wheel being held together by a snap catch 22 and the ends at the outside of the wheel being pulled together and locked by a strap 19 and buckle 20. The flexibility or elasticity of the semi-circular members is such as to facilitate desirable adaptation of the shapes thereof to the particular wheel with which the device is used. In use, under the application of some external force, the cross pieces 2 may pull against a loop or portion 11 and the adjacent portions of the particular semi-circular member may yield slightly outwardly so that no abrupt jar or drag is imposed upon the cross pieces 2. Upon removal of the force applied against the cross pieces, the semi-circular members may return to their inward operating positions. The device may be readily applied to a wheel and as readily removed therefrom. In practice it has proven possible to apply or to remove the device from a wheel within approximately one minute. No jacking up of the car or vehicle is necessary prior to application of the device to a wheel. The device possesses sufficient rigidity for ready application and removal and yet is not of such completely limp or flexible construction as to render difficult its application to and removal from a wheel.

It will be seen that the present invention provides a new and improved and highly desirable traction improving device which may be readily applied to and removed from a vehicle wheel. In instances where the device is utilized with trucks or busses, two or more cross pieces may be attached to each of the loops or securing portions 11 to give increased tractive effect. The construction of the device facilitates use of a single size device with a relatively wide range of wheel sizes. The device is rugged in construction and well able to withstand the rough usage to which it may be subjected.

As various changes may be made in the form, construction and arrangement of the part therein without departing from the spirit and scope of the invention and without sacrificing any of its advantages, it is to be understood that all matter herein is to be interpreted as illustrative and not in a limiting sense.

Having thus described my invention, I claim:

1. A device adapted to be utilized to provide increased tractive effect, comprising, in combination, a plurality of spaced cleat-like means adapted to extend over the periphery of a wheel, and a plurality of substantially semi-circular retaining members having interconnecting loops hingedly connecting them together relatively loosely and joined with the ends of said cleat-like means to retain the spaced relationship of the cleat-like means.

2. In a device of the class described, the combination of a first pair of substantially semi-circular members having interconnecting end loops forming a relatively loose joint and each provided with a plurality of spaced loops and adapted to be positioned at one side of a wheel when in use, a second pair of substantially semi-circular members having interconnecting end loops forming a relatively loose joint and each provided with a plurality of spaced loops and adapted to be positioned at an opposite side of said same wheel when in use, means movably connecting said first pair of members together adjacent one end thereof, means movably connecting said second pair of members together adjacent one end thereof, cross members connected with a plurality of said loops provided for said first pair of members and with a plurality of said loops provided for said second pair of members and adapted to extend over the periphery of a wheel when the device is in use, and means for adjustably securing together the other ends of each of said pairs of semi-circular members.

3. In a device of the class described, the combination of a plurality of substantially semi-circular members, interconnecting loops connecting the ends of said members together to form a relatively loose joint, a traction-improving member connected with one of said interconnecting end loops, additional traction-improving means connected with said semi-circular members and adapted to extend across the periphery of a wheel, and means for securing together normally free ends of said semi-circular members to thereby retain said device on a wheel.

4. In a device of the class described, the combination of a plurality of substantially semi-circular members, interconnecting apertured portions joining the ends of two of said members together to form a relatively loose joint, traction-improving means connected with one of said interconnecting apertured portions and adapted to extend across the periphery of a wheel, apertured connecting means extending outwardly from said semi-circular members at circumferentially spaced intervals, traction-improving means releasably connected with a plurality of said apertured connecting means and adapted to extend across the periphery of a wheel, apertured connecting means adjacent the free end of each of said semi-circular members, traction-improving means connected with one of said apertured connecting means and adapted to extend across the periphery of a wheel, and means for securing together the normally free ends of said semi-circular members to thereby retain said device on a wheel.

5. In a device of the class described, the combination of a pair of substantially arcuate members, means connecting said members together at one point to form a relatively loose joint, a plurality of loops formed by said arcuate members extending outwardly from said arcuate members at circumferentially spaced intervals, traction-improving means connected with certain of said loops and adapted to extend across the periphery of a wheel, loops of more than a single convolution adjacent the normally free ends of said pair of arcuate members adapted to facilitate retention together of said free ends, and traction-improving means interconnected with a free end loop of said pair of arcuate members and adapted to extend across the periphery of a wheel.

CHARLES JOHN LINDENTHALER.

REFERENCES CITED

The following references are of record in the file of this patent:

UNITED STATES PATENTS

| Number | Name | Date |
| --- | --- | --- |
| 1,488,887 | Lee | Apr. 1, 1924 |
| 1,801,159 | Hunter | Apr. 14, 1931 |

FOREIGN PATENTS

| Number | Country | Date |
| --- | --- | --- |
| 27,169 | Great Britain | Nov. 29, 1906 |